UNITED STATES PATENT OFFICE.

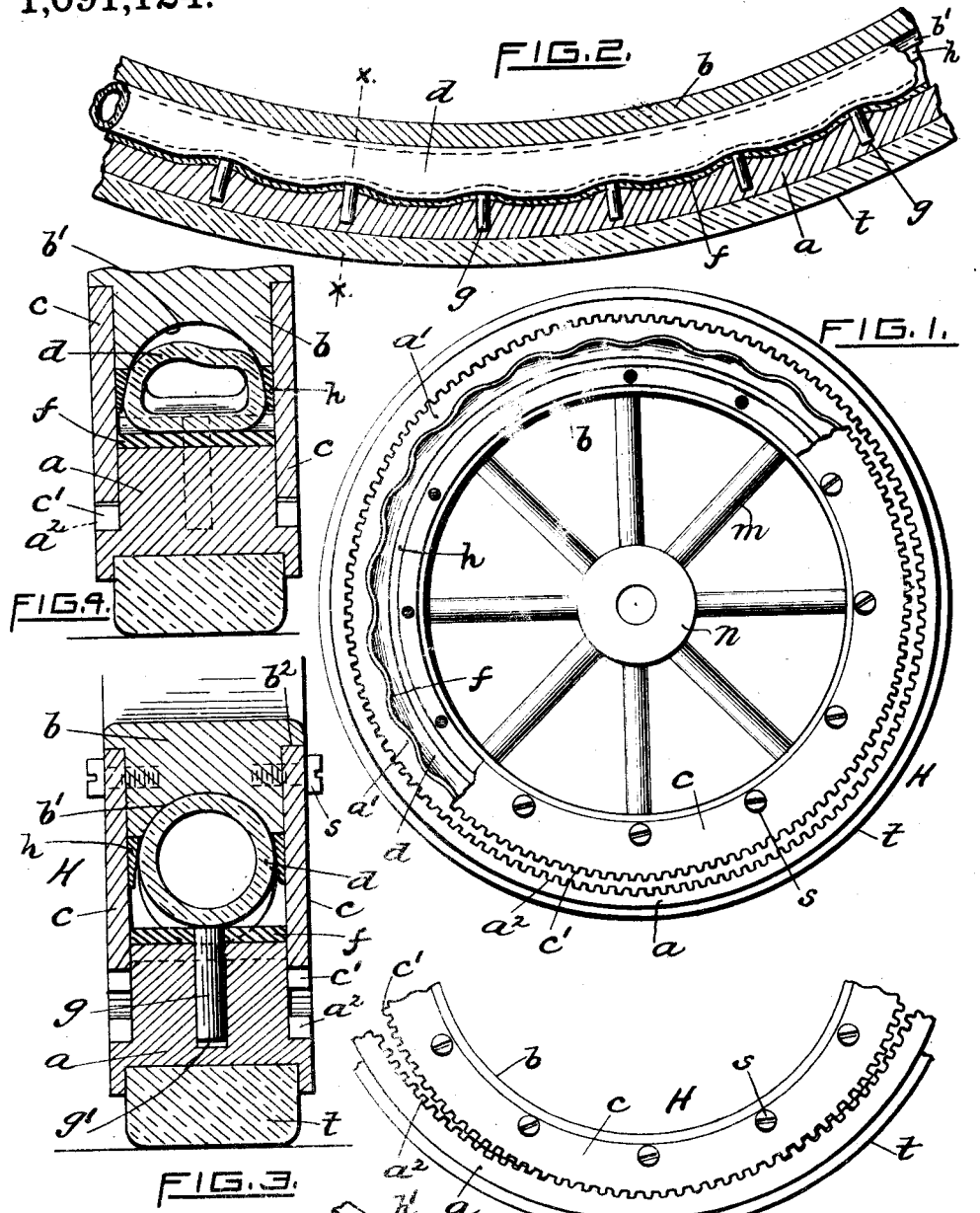

THOMAS DYER, OF CRANSTON, RHODE ISLAND.

VEHICLE-WHEEL.

1,091,124.  Specification of Letters Patent.  Patented Mar. 24, 1914.

Application filed September 8, 1913. Serial No. 788,528.

*To all whom it may concern:*

Be it known that I, THOMAS DYER, a citizen of the United States, residing at the city of Cranston, in the county of Providence and State of Rhode Island, have invented certain new and useful Improvements in Vehicle-Wheels, of which the following is a specification.

The object of my invention is to provide a vehicle wheel with a pneumatic tube which is wholly inclosed in a housing of special construction, in order to maintain a proper resiliency of the wheel, and thereby to serve the purposes of wheels having pneumatic tires.

Another object of my invention is to provide means by which, while the pneumatic tube is inflated, the felly and the rim are separated radially by the inflation of said tube, but when the pneumatic tube is deflated, the felly and the rim are adapted to come into engagement with each other, along the tread, by spur teeth or cogs and each coöperating with similar teeth or cogs on the other so long as such deflation continues.

A still further object of the invention is to provide means to permit the wheel to travel along the road and to minimize jar or shock, whenever the said pneumatic tube becomes deflated.

With these and other objects in view the invention consists of the novel construction, and combination of parts, as hereinafter described and claimed, reference being had to the accompanying sheet of drawings wherein like reference characters indicate like parts.

Figure 1 is a side elevation of the outer part or rim portion of a vehicle wheel, with one of the side plates broken away, and illustrating the parts embodying my invention. Fig. 2 is a central longitudinal section of a portion of the housing and showing the pneumatic tube confined therein. Fig. 3 is an enlarged cross-section of the housing taken on line $x$—$x$ of Fig. 2, showing the normal position of parts as when the inclosed pneumatic tube is inflated. Fig. 4 is a similar view, showing the position the parts assume when the tube becomes deflated. Fig. 5 is a partial side elevation of Fig. 4. Fig. 6 is a partial view of one of the guard rings.

My invention consists of seven principal members, namely, a rim —$a$—; a felly —$b$—; side plates —$c$— carried by the latter; a pneumatic tube —$d$—; spokes —$m$— and a hub —$n$—, which is adapted to be mounted rotatably on an axle. The rim —$a$—, which has a channel to receive a solid rubber tire —$t$—, is provided with a series of transversely-arranged equi-spaced corrugations, as —$a^1$—, formed crosswise upon the entire inner periphery of said rim, in the manner shown in Fig. 1. A hub —$n$— is mounted rotatably upon an axle and spokes —$m$— extending radially from the hub —$n$— support the felly —$b$— in the usual manner.

A flat leather band —$f$— is made to fit into and over the corrugated surface of the rim —$a$— and is held from displacement thereon by means of rubber dowel pins —$g$—, which loosely enter openings —$g^1$— formed radially of said rim. The felly —$b$— is concaved along its inner periphery as at —$b^1$—, to receive the inner part of the pneumatic rubber tube —$d$—, and the latter, when inflated, bears against the corrugated surface of the leather band —$f$—. The plates —$c$, $c$— are secured to the sides of the felly —$b$—, by screws —$s$—, and said plates extend around the housing, which is designated by reference letter H as a whole, in a ring form and of a depth sufficient to have a sliding movement upon opposed side faces of the rim —$a$—. The inner edge of each ring plate —$c$— abuts a shoulder formed on the felly —$b$—, as at —$b^2$— in Fig. 3, and each plate has its outer edge formed with a series of spur teeth —$c^1$—, to mesh with a like series of teeth —$a^2$— formed on each side of the rim.

The pneumatic tube —$d$— is preferably made of rubber, and is elastic. When said tube is inflated (by means of an air valve or pump, as heretofore common) it bears firmly in contact upon the irregular surface formed by the corrugations of the band —$f$—, which overlies the corrugated inner periphery of the rim —$a$—. While the tube —$d$— continues to maintain its inflated condition, the rim —$a$— and the felly —$b$— are held by said tube and are spread apart radially and are concentric with each other, as illustrated in Figs. 1, 3 and 7, the teeth —$c^1$— and —$a^2$— being then out of engagement. In this position the friction of the band —$f$— upon the pneumatic tube —$d$— and upon the transverse corrugations —$a^1$— of the rim —$a$— compel the felly —$b$— and rim —$a$— to rotate or travel together. But when the pneumatic tube —d— is deflated, as represented in Fig. 4, it can no longer hold radially apart the felly —b— and rim —a—, but said felly drops by gravity to the position shown in Figs. 4 and 5, and then the teeth —c¹, c¹—, of the ring plates —c, c—, engage the teeth —a², a²— of the rim —a—, as seen in Figs. 4 and 5, along the inner periphery of the tread portion of the rim —a— and the portion of the outer periphery of the felly which is then immediately adjacent to said portion of the rim. This engagement continues along whatever contiguous portions of said peripheries of the felly and rim happen then to be lowermost during the travel of the wheel, so long as the pneumatic tube remains deflated, and thus during this time the rim —a— is driven by the teeth —c¹, c¹—, of the plates —c, c—, of the felly —d—. During this engagement, the felly —d— and rim —a— are not concentrically related, as shown in Fig. 1, but are eccentrically related, as shown in Fig. 5.

In order to prevent the tube, when inflated, from chafing against the sides of the plates —c—, I employ thin flat-sided brass rings or guard members —h— which loosely surround the felly, and each member has several dished out grooves vertically-arranged on its inner face, as at —h¹— in Fig. 6. These guard rings —h— have their inner faces beveled outwardly from the concave seat —b¹— of the felly, to permit the rubber to enter each groove —h¹— so that the guard members —h— are made to rotate together with the tube, and thus wear upon the sides of the latter is prevented. By means of the corrugated leather seat —f—  the tube is enabled, when in a collapsed condition, to afford sufficient resiliency to reduce shock or jar as the wheel travels along the road.

By having the pneumatic tube —d— confined within the housing, as described, deterioration of the material is lessened to a great extent and the tube kept serviceable to endure for a long period, and at the same time the structure provides for convenience and adaptability to the various conditions that arise in a vehicle wheel.

Having described my invention what I claim and desire to secure by Letters Patent, is:—

In a vehicle-wheel, the combination of a pneumatic rubber tube, a housing for said tube comprising a circular rim whose inner periphery is formed into equi-spaced transverse corrugations; a tire upon the outer periphery of the rim; a felly having a longitudinal concave seat in which seat said pneumatic tube is held by the air-pressure within said tube; plates secured to the felly and slidable upon the sides of the rim, respectively; two metallic rings loosely surrounding the said felly and adapted to protect the said tube from frictional wear, each ring having a series of concavities wherein said tube is expansible, and means whereby said plates are adapted to impart rotation to the rim whenever the tube is deflated.

In testimony whereof I affix my signature in presence of two witnesses.

THOMAS DYER.

Witnesses:
C. T. HANNIGAN,
W. A. MUNROE.